United States Patent
Watanabe et al.

(10) Patent No.: US 7,317,665 B2
(45) Date of Patent: Jan. 8, 2008

(54) OPTICAL RECORDING METHOD USING MULTIPLEXER AND PLURAL PIECES OF DATA BITS

(75) Inventors: Koichi Watanabe, Hachioji (JP); Hiroyuki Minemura, Kokubunji (JP)

(73) Assignees: Hitachi, Ltd., Tokyo (JP); Hitachi-LG Data Storage, Inc., Tokyo (JP)

( * ) Notice: Subject to any disclaimer, the term of this patent is extended or adjusted under 35 U.S.C. 154(b) by 776 days.

(21) Appl. No.: 10/773,437

(22) Filed: Feb. 9, 2004

(65) Prior Publication Data
US 2005/0007840 A1     Jan. 13, 2005

(30) Foreign Application Priority Data
Jul. 11, 2003   (JP)  .............................. 2003-378857

(51) Int. Cl.
*G11B 11/00*   (2006.01)
(52) U.S. Cl. ................................. 369/13.27; 369/59.11
(58) Field of Classification Search ...................... None
See application file for complete search history.

(56) References Cited

U.S. PATENT DOCUMENTS

| | | | | |
|---|---|---|---|---|
| 5,123,007 A | * | 6/1992 | Miyauchi et al. | 369/13.24 |
| 5,323,374 A | * | 6/1994 | Arai et al. | 369/116 |
| 5,339,298 A | * | 8/1994 | Saito | 369/13.24 |
| 5,396,480 A | | 3/1995 | Morishita et al. | |
| 5,457,666 A | * | 10/1995 | Toda et al. | 369/13.24 |
| 5,561,642 A | * | 10/1996 | Saito et al. | 369/13.24 |
| 5,905,695 A | * | 5/1999 | Kimura | 369/13.24 |
| 6,801,240 B2 | * | 10/2004 | Abe et al. | 347/252 |

FOREIGN PATENT DOCUMENTS

| | | |
|---|---|---|
| JP | 6-162507 | 11/1992 |
| JP | 6-243589 | 2/1993 |
| JP | 2003-152728 | 11/2001 |

\* cited by examiner

*Primary Examiner*—Tan Dinh
(74) *Attorney, Agent, or Firm*—Reed Smith LLP; Stanley P. Fisher, Esq.; Juan Carlos A. Marquez, Esq.

(57) ABSTRACT

Information recording equipment of the present invention includes a multiplexer to generate n pieces of synchronous high-speed pulses. Instead of a normal m:1 multiplexer configuration for parallel-serial conversion, an m:n multiplexer configuration is used which generates m pieces of output signals from n pieces of input signals. The recording equipment including the m:n multiplexer enables high-resolution and high-speed pulse generation and carries out multipulse and multilevel signal generation.

15 Claims, 20 Drawing Sheets

DL: DELAY LINE      PD: PHASE DETECTOR

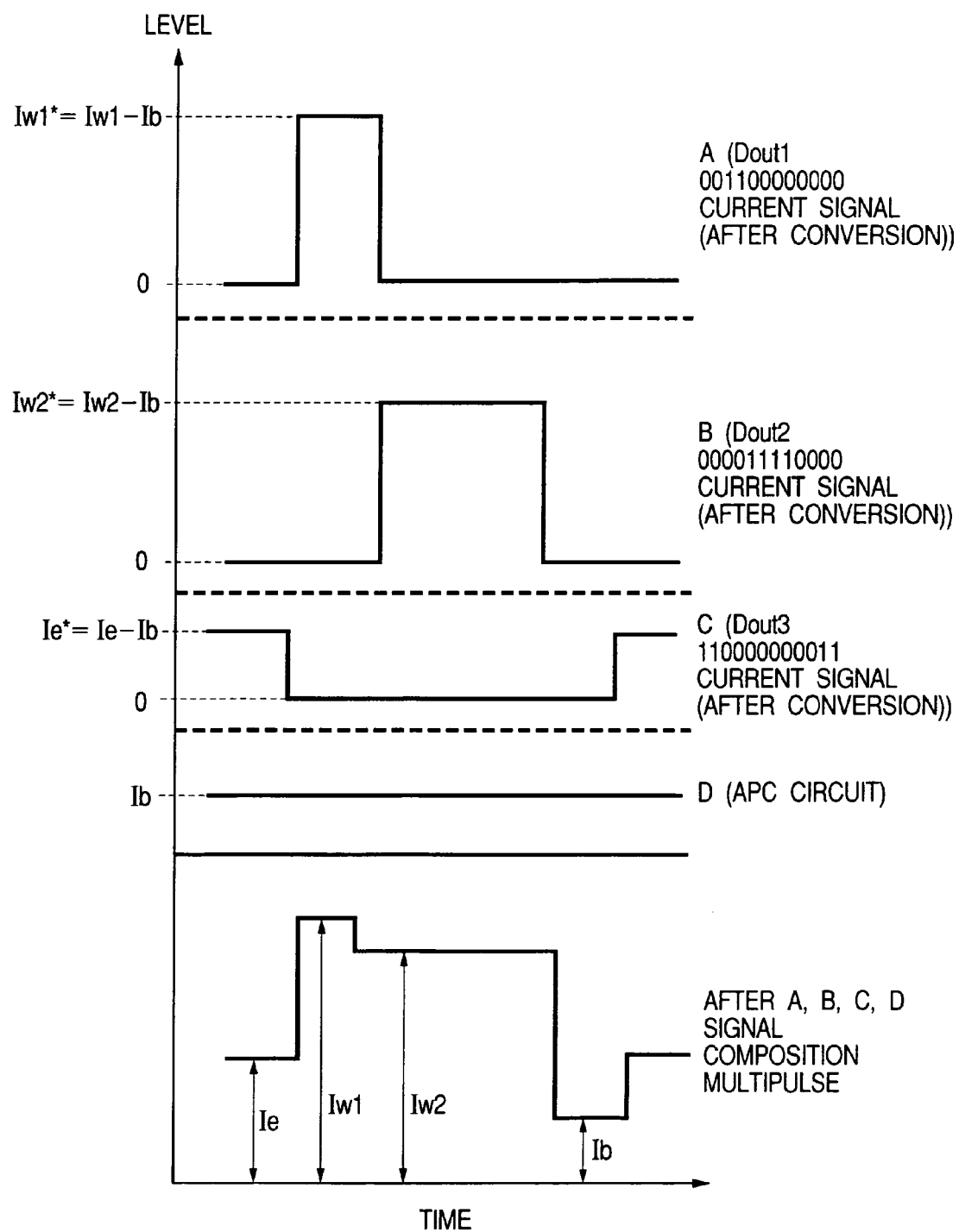

OPTICAL RECORDING METHOD USING MULTIPLEXER AND PLURAL PIECES OF DATA BITS

FIELD OF THE INVENTION

The present invention relates to high-speed pulse generation in optical disk storage equipment such as CD-R drive, CD-RW drive, DVD-R drive, DVD-RW drive, DVD-RAM drive, and Blu-ray drive devices which drive and control multi-leveled and multi-pulsed optical modulation waveforms when recording data on data recording media and data recording evaluation equipment.

The present invention also relates to high-speed pulse generation in a data recording method in the field of magnetic recording, by which data is recorded by intermittently heating a data recording medium by irradiating the medium with laser beam pulses in synchronization with a reference clock for recording, while applying a magnetic field with polarity being reversed in accordance with data to be recorded in synchronization with the reference clock.

BACKGROUND OF THE INVENTION

With a great increase in the capacity of optical disk storage equipment, there is an urgent need to increase write speed. For optical disk drive devices in which data is recorded on optical disks (data recording media) by optical modulation of laser beam, necessary are a one-beam overwrite technique and a technique for controlling optical modulation waveforms by multi-pulsing and multi-leveling the waveforms in order to control the shape of a recording mark, which is required to enhance recording density. To further enhance high-speed recording and high-density recording, even a higher data transfer rate, pulse splitting into sub-pulses with even shorter width, and increase in the number of power levels will be required in future.

For example, a write strategy technique which is applied to DVD-RW uses a plurality of laser pulses with three different power levels as is illustrated in a write strategy example shown in FIG. 2. These three power levels are write power Pw, erase power Pe, and bottom/read power Pb in descending order of level. When an optical disk is irradiated by laser beam with the above write power Pw, the recording film subject to the laser beam irradiation in the optical disk melts. Then, as the optical disk is rapidly cooled, the irradiated portion of the recording film becomes amorphous and its light reflectivity becomes low. This portion is used as a recording mark. When the optical disk is irradiated by laser beam with the erase power Pe, the recording film is crystallized. The amorphous portion of the optical disk before the laser beam irradiation becomes crystalline and the crystal portion thereof remains crystalline. Thereby, the recording mark can be removed. Laser beam with the read power Pb is used to read a data signal recorded on the optical disk.

Because a recording mark is written on a medium by a train of write strategy pulses when recording, accuracy of timing of the first and last write strategy pulses is important to enhance the accuracy of the recording mark edges. Pulse splitting into even shorter sub-pulses and increase in the number of power levels become more difficult as write speed rises in terms of two viewpoints: accuracy of timing at a high speed and synchronization of a plurality of pieces of data. Clock frequencies of 2-3 GHz have heretofore been required and timing accuracy of write pulses has been obtained by setting time to start and time to stop each pulse by using a plurality of fixed delay lines 16-1, 16-2, . . . as is shown in FIG. 3 or by using the output from a tap that is proximate to a target position, one of the taps of closely spaced steps of a multistage delay block, and thereby the foregoing write pulses are generated. In JP-A No. 243589/1994, a technique in which a clock is generated by delaying a clock from a phase locked loop (PLL) is described. In the data communications area, a parallel-to-serial conversion technique using a multiplexer is applied, as is described in JP-A No. 152728/2003.

[Patent Document 1] JP-A No. 243589/1994
[Patent Document 2] JP-A No. 152728/2003

SUMMARY OF THE INVENTION

A conventional method for control of alternating duration Tpw and duration Tpb so that Tpw and Tpb appear at a given ratio during a bit period T of recording data shown in FIG. 2 is to set time to start and time to stop each pulse by using a plurality of fixed delay lines or by using the output from a tap that is proximate to a target position, one of the taps of closely spaced steps of a multistage delay block, and thereby generating write pulses. Particularly, a pulse edge jitter has a great effect on reading jitter and, therefore, higher timing accuracy is required for high-speed recording that will advance in future. However, the conventional control method is directly affected by temperature characteristics and variation in delay lines. Thus, even if calibration is performed in measuring length of T in units of stages or steps, it is difficult to maintain timing accuracy less than hundreds of picoseconds.

Future high-speed recording is expected to accommodate variation in write speed that is multiplied by a factor of n (for example, a factor of 1 to 10) and it is desirable that write pulses follow change in the linear velocity of recording. Although there is a method of changing the delay amount according to speed, using the above multistage delay block, the jitter amount (jitter on the time axis) of waveforms increases as the speed rises and the period becomes shorter. Furthermore, Constant Angular Velocity (CAV) recording, Zone Constant Angular Velocity (ZCAV) recording, and the like will be used in the optical disk segment in future. The merit of such recording method is that a smaller spindle motor can be employed to give a constant disk revolution speed. However, the linear velocity changes, according to a position with respect to the radial direction of a disk, and it is desirable that write pulses follow change in the linger velocity. In this case as well, a method of changing the delay amount according to a position with respect to the radial direction of a disk, using the above multistage delay block, is conceivable, but, it is still difficult to maintain timing accuracy less than hundreds of picoseconds.

In view of the above discussion, it is an object of the present invention to provide data recording equipment and a data recording method that can generate write pulses adaptively for and following inconstant disk revolution and change in liner velocity and record data signals, using a high-frequency clock.

From a viewpoint of high speed technology, in the optical communications area, the introduction of a 40 Gbps system of Time Division Multiplexing (TDM) is in sight and high speed technology at 40 Gbps is established. In this high speed system, a multiplexer (MUX) as a parallel-serial conversion circuit is used to increase data transfer speed. By way of example, a 4:1 multiplexer is shown in a block diagram of FIG. 4.

The 4:1 multiplexer circuitry of FIG. 4 converts four 2.5 Gbps data signals into one 10 Gbps data signal. Specifically, the circuitry includes two 2:1 multiplexers 18-1 and 18-2, each of which multiplexes two 2.5 Gbps data signals and converts them into a 5 Gbps data signal and two 5 Gbps data signals are further multiplexed to the 10 Gbps data signal by a further 2:1 multiplexer 18-3. A 5 GHz clock which is used for the 2:1 multiplexer 18-3 is generated by dividing a 10 GHz clock by a clock divider by two 19-2. A 2.5 GHz clock which is used for the 2:1 multiplexers 18-1 and 18-2 is generated from another clock divider by two 19-1 which further divides by two the 5 GHz clock generated from the clock divider by two 19-2. This circuit is formed with basic 2:1 multiplexer elements whose common configuration is shown in FIG. 5. By employing a plurality of 2:1 multiplexer elements, an 8:1 multiplexer, a 16:1 multiplexer, etc. can be constructed besides the 4:1 multiplexer, which are used in the optical communications field.

In this basic 2:1 multiplexer configuration, a 2:1 selector (2:1 SEL in FIG. 5) 21 is a principal component for parallel-serial conversion and, therefore, the operation of the selector is explained, using a timing chart of the selector shown in FIG. 6. DIN1 and DIN2 are data input signals and CIN is a clock input signal, and an ideal state is that a clock CIN pulse aligns with the center of a time slot of DIN1/DIN2 data input signal. The 2:1 selector 21 selects a DIN1 when CIN=H and a DIN2 when CIN=L. As apparent in the timing chart of FIG. 6, by this selector operation, two input data signals DIN1 and DIN2 are multiplexed to one output OUT signal whose data speed becomes double the data speed of the input data signals. Thus, this multiplexer circuit controls the delay amount of low-speed parallel signals on the order of several picoseconds by a delay for line length within the circuit and through delayed flip-flops (D-FFs) 20 and a function of parallel-serial conversion to boost data speed which is performed by the 2:1 selector 21, using the clock, is integrated into it. Also, the multiplexer circuit ensures synchronization of the input signal pulses and the output signal pulses with the clock signal pulses and performs waveform shaping. In the present invention, high-speed pulse generation using the multiplexers which are used for parallel-serial conversion in the optical communications area has been devised.

Use of the invented method enables a clock accuracy of 25 ps in the case of a 40 GHz clock which is used at a 40 Gbps transfer rate. However, in the optical disk segment, multi-pulsing requires a plurality of data signals to be synchronized and output. It is conceivable to use a plurality of multiplexers in order to output a plurality of data signals. In this case, synchronizing the plurality of multiplexers and timing alignment across the plurality of data signals are difficult. The commonly used multiplexer configuration for multiplexing m pieces of input signals eventually to one output signal is changed to a configuration for multiplexing the m pieces of input signals to n pieces of output data signals. By using a single source of generating a clock to be used for multiplexing to the n pieces of output data signals, synchronization of the n pieces of output signals can easily be ensured.

FIG. 1 is a diagram showing a configuration example of data recording equipment using a high-speed pulse generator according to the present invention. Encoded data is converted into m pieces of parallel data signals through a recording pulse shaping circuit 10. The m pieces of data signals are converted into n pieces of output signals through an m:n multiplexer 11. The n pieces of output signals from the m:n multiplexer 11 are used to control switches 14-1, 14-2, ..., 14-n connected to current sources 13-1, 13-2, ..., 13-n which respectively generate recording current $I_1, I_2, \ldots, I_n$ located in an LD driver circuit 15.

Instead of a normal m:1 multiplexer (to generate one output signal from m pieces of input signals), the m:n multiplexer is configured to generate n-pieces of output signals and used for multipulse generation. An internal clock ensures signal synchronization within the m:n multiplexer IC, data transfer starts at the same timing and the circuit operates without a problem. Moreover, because of a high distance accuracy of n pieces of output lines, the n-pieces of output signals through the output lines from the m-n multiplexer have even delay amounts and data is easy to pass to a port of an entity for subsequent operation. The n pieces of output signals need not be transferred at only a single rate; a variable rate of transfer may be used, according to application.

The m:n multiplexer includes a clock multiplier function to multiply a low-speed clock which is used for input data to the m:n multiplexer by a factor of n and generate a high-speed clock. Multiplexing and latching are performed, based on this high-speed clock, and, consequently, pulse positional accuracy can be enhanced. Because only the low-speed clock is used for input from the external, the high-speed clock is not handled externally and high accuracy pulses can be generated. Furthermore, by outputting the clock that must be used within the multiplexer to the external when data is read, high frequency convolution can be used to decrease laser diode noise. By the switches 14-1, 14-2, ..., 14-n of the current sources 13-1, 13-2, ..., 13-n which are controlled with the n-pieces of synchronous high-speed pulses supplied thereto, the amount of current flowing through a laser diode 12 whose light beam output changes, depending on the current amount, is adjusted, and the laser diode is able to generate optical multipulse signals at a high speed.

The pulse generation method of the present invention is suitable for optical disk storage systems or magneto optical disk systems and the like with a transfer rate of 100 Mbps and more in which clock accuracy is considered difficult to maintain by means of fixed delay lines.

According to the present invention, high-speed pulses of n pieces of synchronous data signals can be generated with high accuracy in order to record data on optical disks or optically-assisted magnetic disks by using multipulse or multilevel signals.

BRIEF DESCRIPTION OF THE DRAWINGS

FIG. 11 is a diagram showing a write strategy example (with four power levels).

DETAILED DESCRIPTION OF THE PREFERRED EMBODIMENTS

Preferred embodiments of the present invention will be described hereinafter with reference to the accompanying drawings.

Embodiment 1

Figure 1:
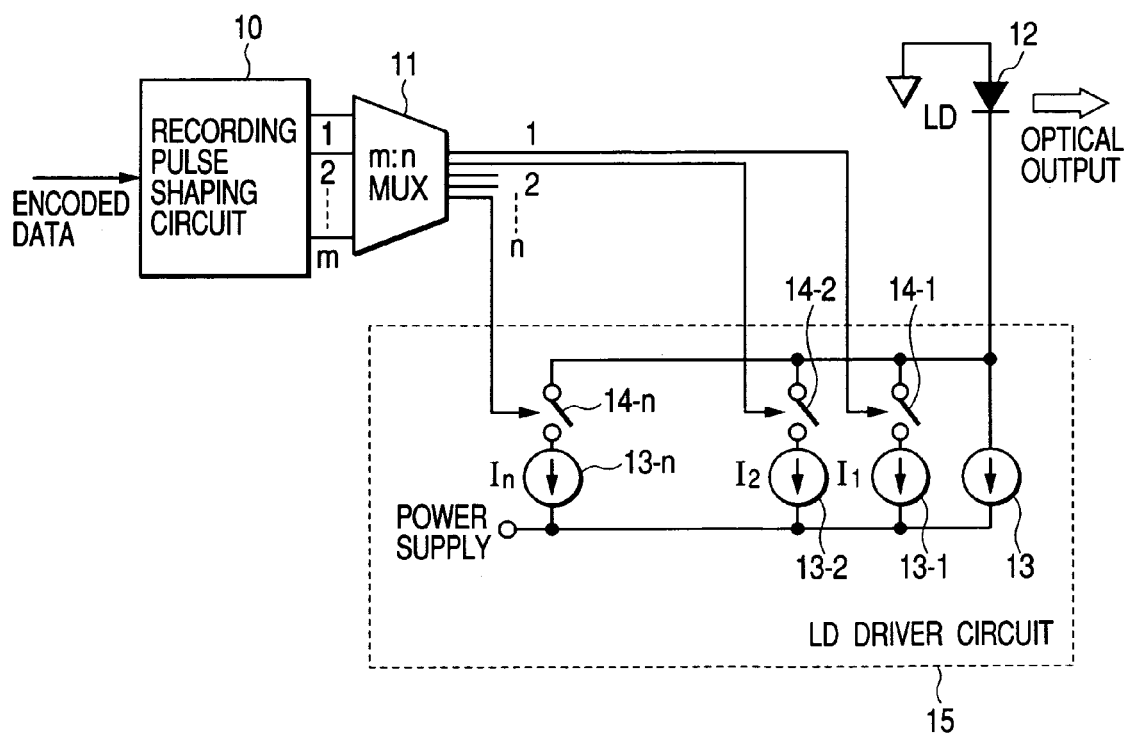
FIG. 1 is a diagram showing a configuration example of optical recording equipment using a high-speed pulse generator according to the present invention.
Figure 2:
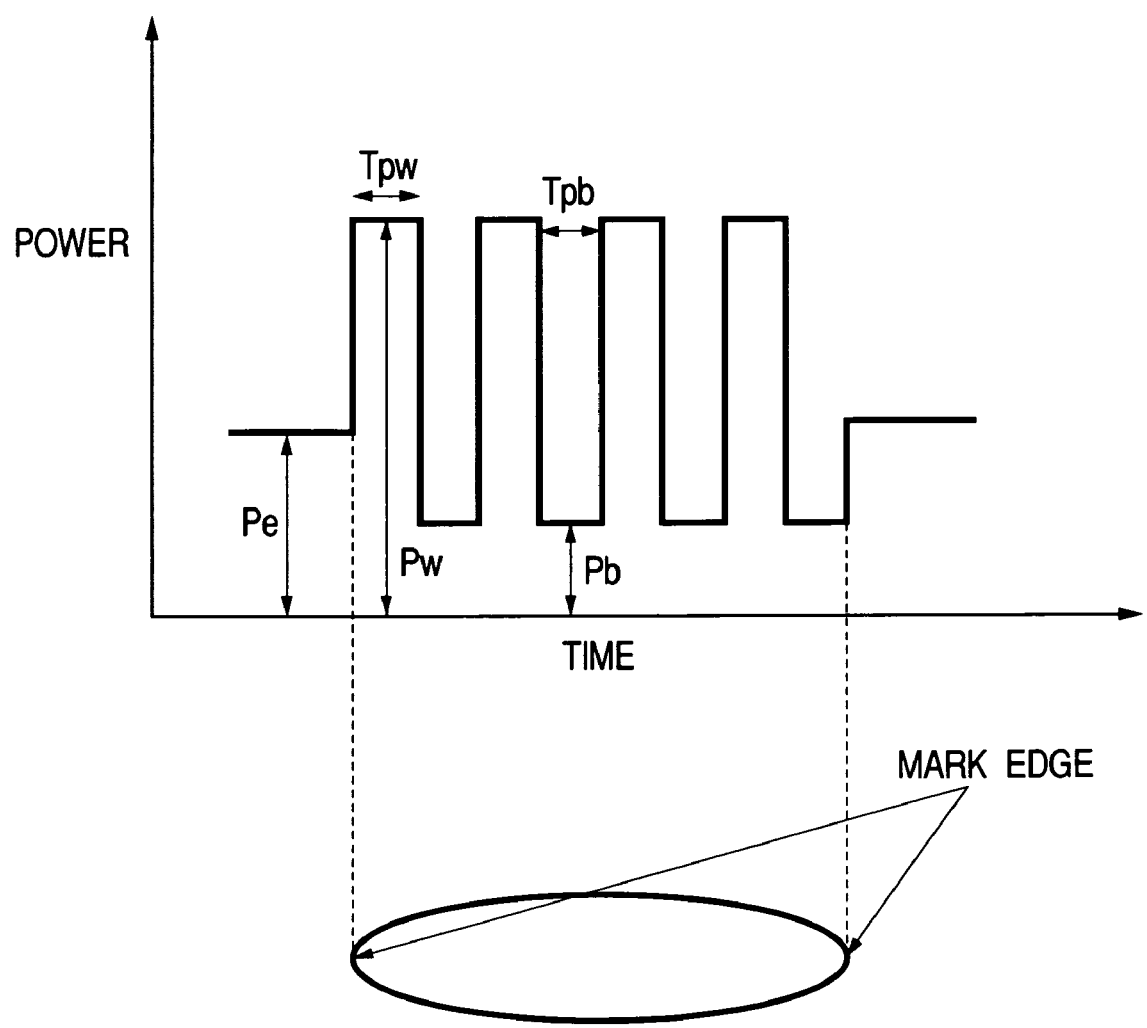
FIG. 2 is an explanatory diagram showing an example of a write strategy (with three power levels) with a recording mark example formed on an optical recording medium by this strategy.
Figure 3:
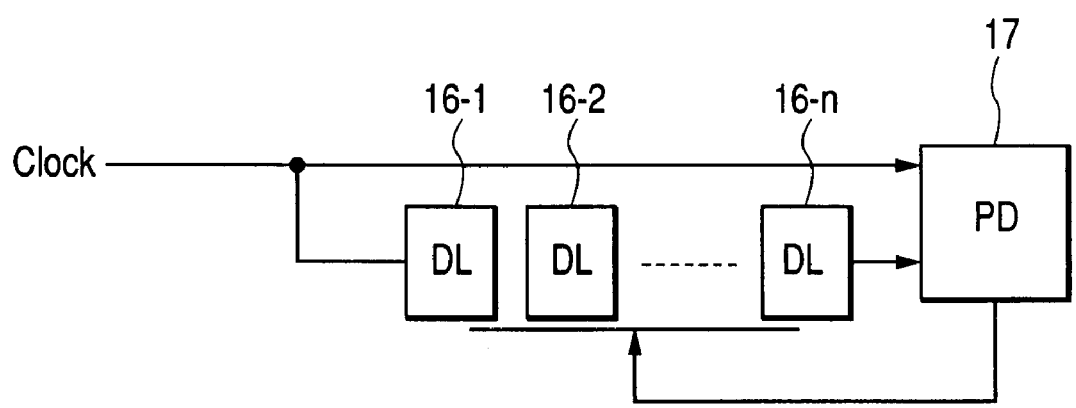
FIG. 3 is a schematic of a circuit for adjusting a delay amount by means of conventional fixed delay lines.
Figure 4:
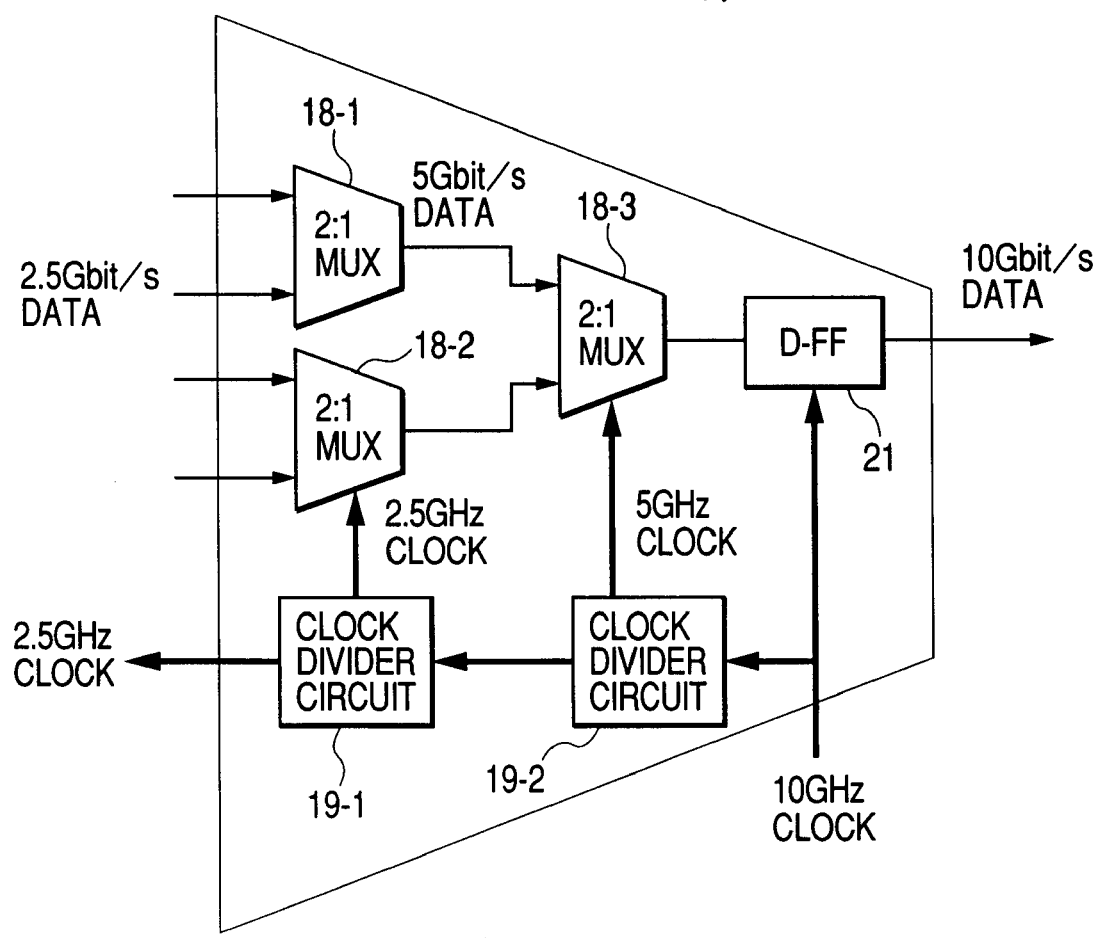
FIG. 4 is a schematic showing a configuration example of a conventional 4:1 multiplexer (MUX).
Figure 5:
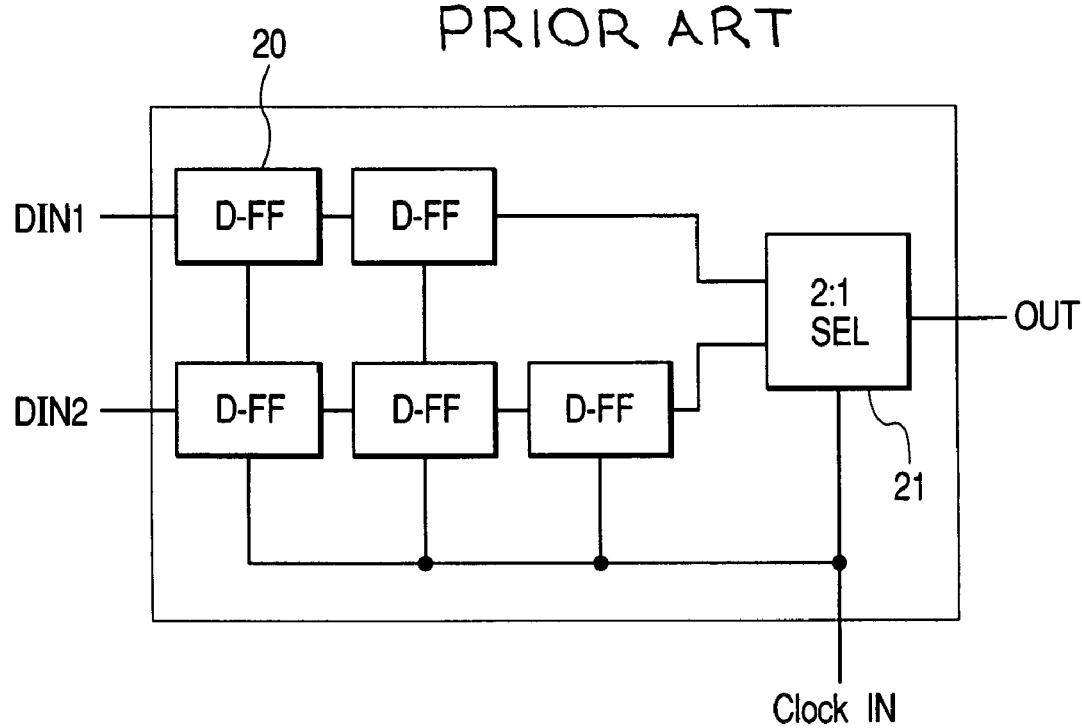
FIG. 5 is a schematic showing a configuration example of a conventional 2:1 multiplexer (MUX).
Figure 6:
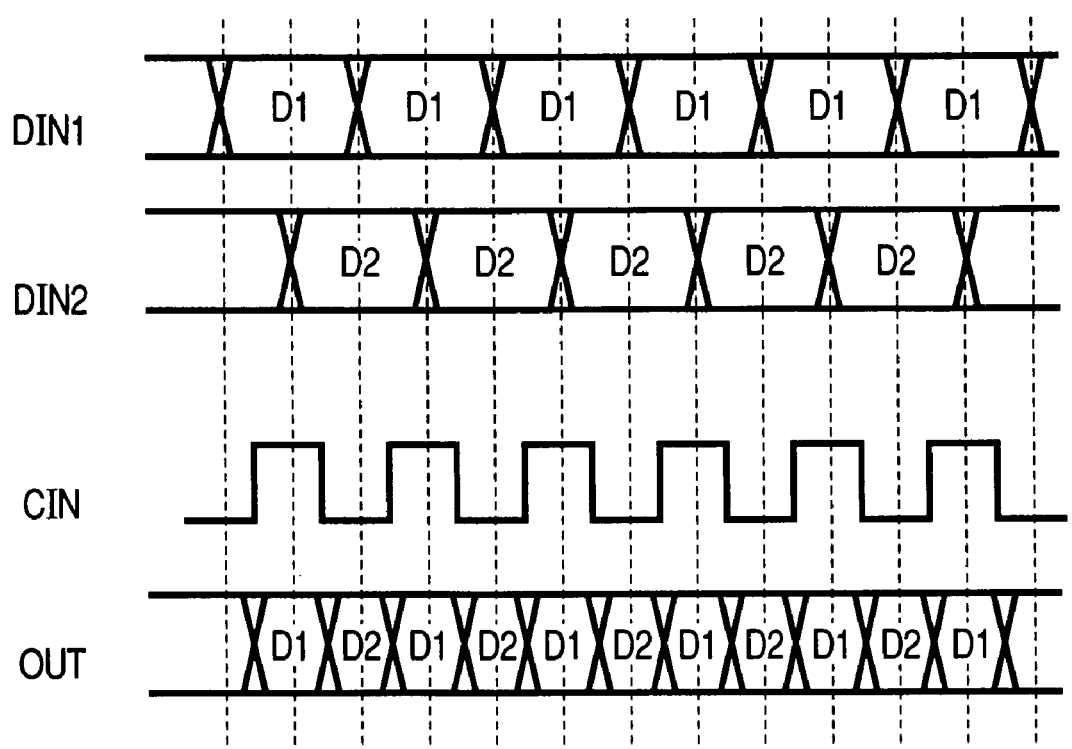
FIG. 6 is a timing chart for explaining an operation principle of a 2:1 selector.
Figure 7A:
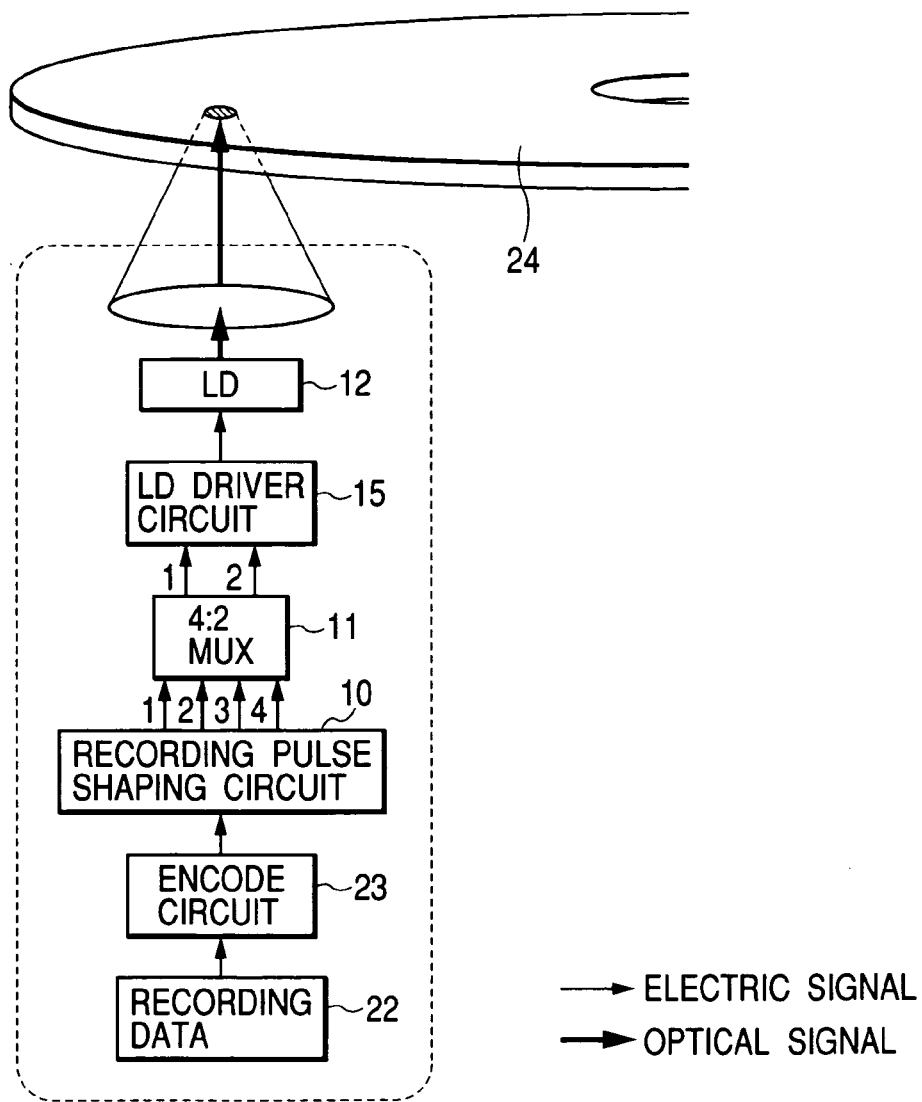
FIG. 7A is a schematic diagram for explaining a flow of processing up to writing signals corresponding to data to be recorded on an optical disk.
Figure 7B:
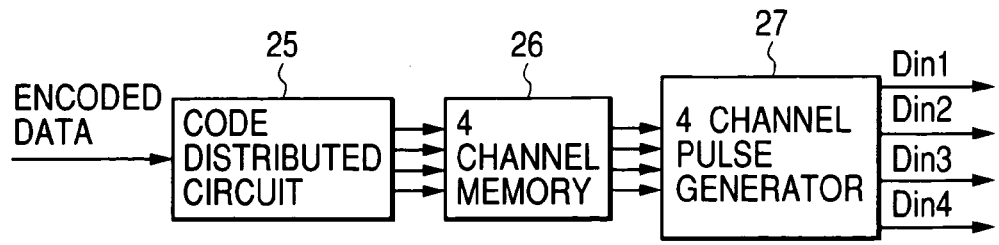
FIG. 7B is a schematic showing an example of a recording pulse shaping circuit.
Figure 8:
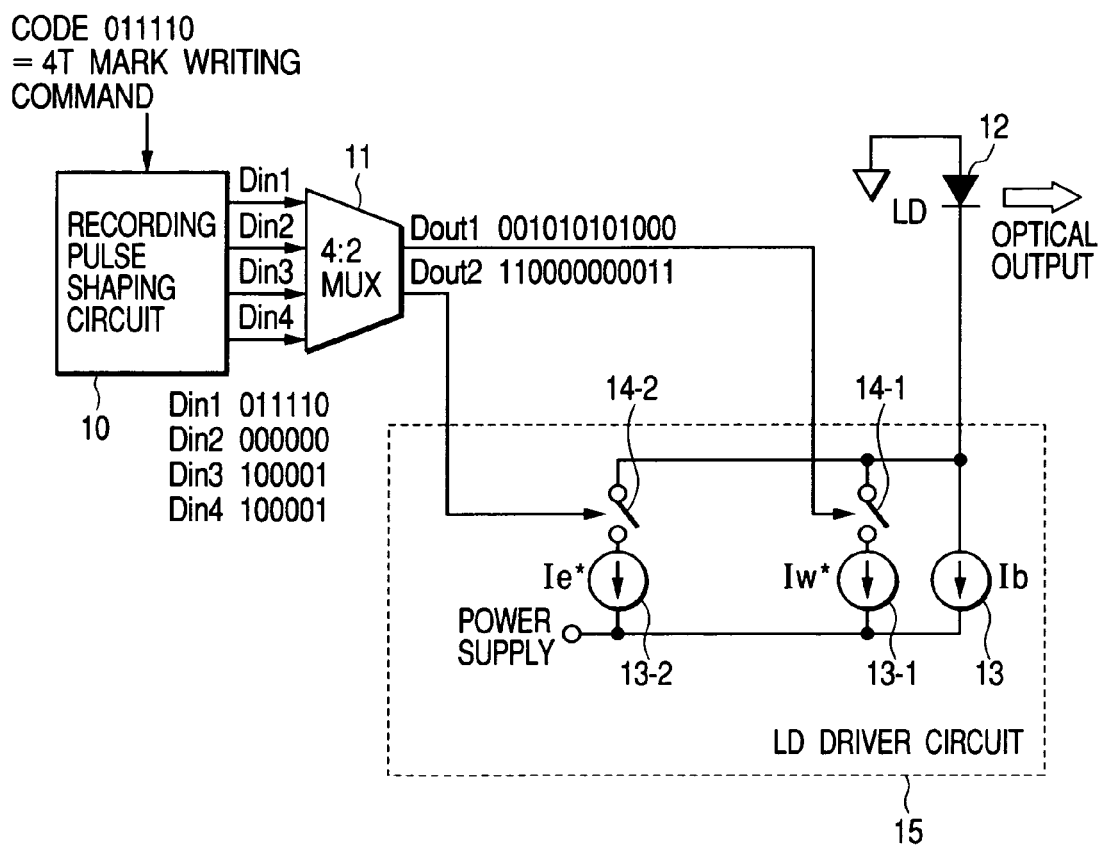
FIG. 8 is a diagram showing a configuration example of optical recording equipment using a 4:2 multiplexer.
Figure 9:
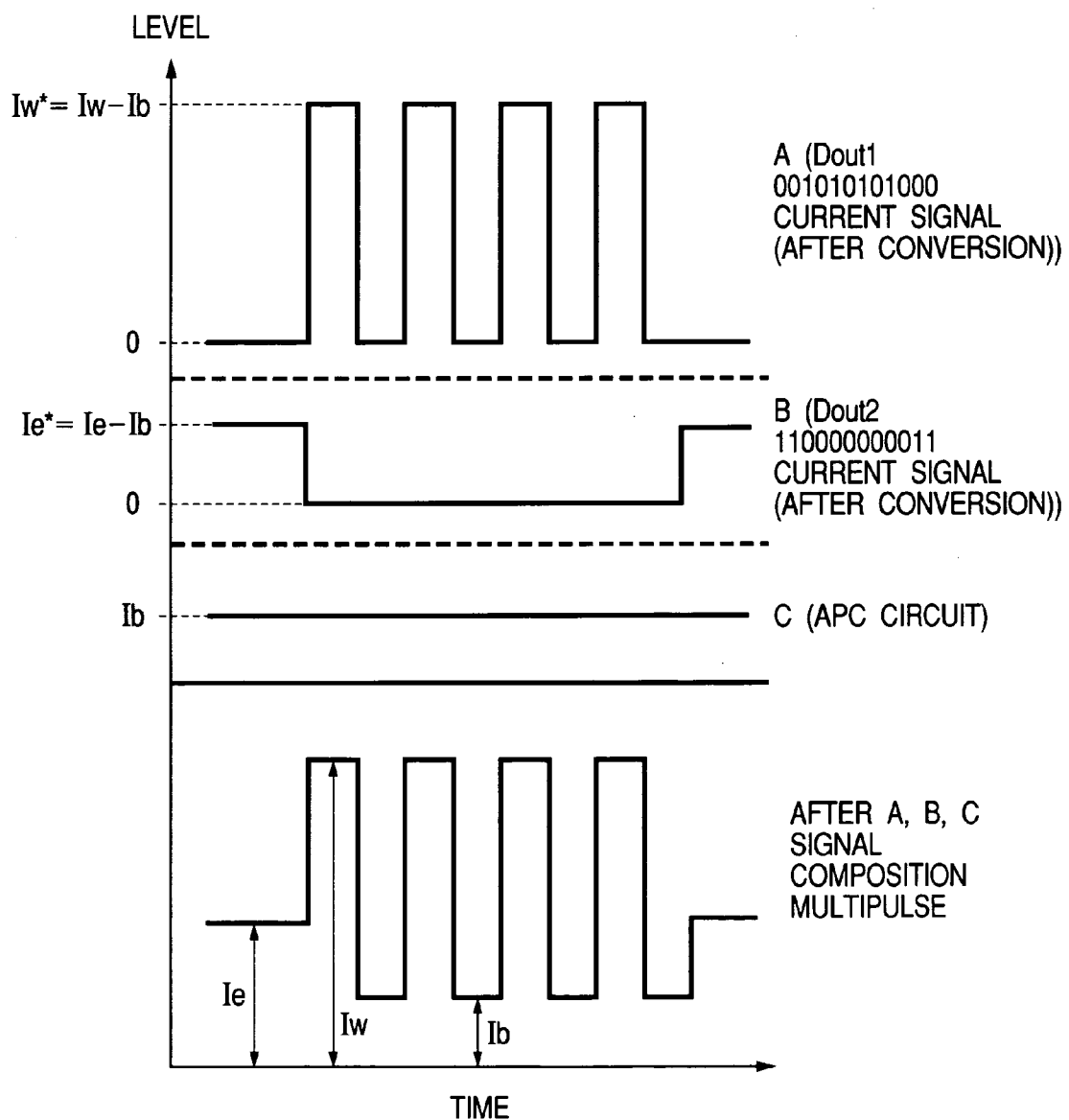
FIG. 9 is an explanatory diagram showing an example of multipulse composition.

A preferred Embodiment 1 of the invention wherein a 4:2 multiplexer is applied to generating multipulse signals is discussed, using FIGS. 7 through 9. FIG. 7A is a schematic diagram for explaining a flow of processing up to writing signals corresponding to data to be recorded on an optical disk. FIG. 7B is a schematic of a pulse shaping circuit. FIG. 8 is a schematic showing an example of the 4:2 multiplexer according to the present invention. FIG. 9 is an explanatory diagram showing an example of multipulse composition.

As shown in FIG. 7A, input data (data to be recorded) 22 is encoded by an encoding circuit 23 and a recording pulse shaping circuit 10 converts signals into which the data is encoded into signals to form a strategy for writing on an optical disk 24. The thus converted signals are signals programmed to be multiplexed and a sequence of four data signals Din1 to Din4 which are serially connected in order of 1 to 4 is input to the 4:2 multiplexer 11 from which two signals are output. These output signals are input to a laser diode driver circuit 15 to drive a laser diode 12 from which multipulse signal light is output.

With FIG. 7B, an example of the pulse shaping circuit 10 is explained. In the pulse shaping circuit 10, a code distribution circuit 25 converts encoded data into signals of four channels. A command consisting of these signals is sent to a four-channel memory 26 where possible combinations of pulses, each corresponding to a write strategy of a mark by a mark length recording method, must be stored in advance. From a four-channel pulse generator 27, a sequence of pulses to be input through Din1, Din2, Din3, and Din4 signal channels to the 4:2 multiplexer 11 are output.

Referring to FIG. 8, a concrete instance where a coded signal "011110" corresponding to 4 T mark length is written on the disk is discussed. In this instance, to obtain a 4 T write strategy which is shown at the bottom of FIG. 9, the recording pulse shaping circuit 10 distributes signals to input "011110" through the Din1 input channel, "000000" through the Din2 input channel, "100001" through the Din3 input channel, and "100001" through the Din4 input channel to the 4:2 multiplexer, as is shown in FIG. 8. The 4:2 multiplexer multiplexes the Din1 and Din2 input signals to "001010101000" which is output through a Dout1 channel and multiplexes the Din3 and Din4 input signals to "110000000011" which is output through a Dout2 channel. The Dout1 and Dout2 output signals become two times as fast as the Din1 to Din4 input signals with pulse positional accuracy being enhanced by a factor of 2.

These two output signals are supplied to turn on/off the switches 14-1 and 14-2 of two current sources 13-1 and 13-2 in laser driver circuitry for recording on an optical disk, shown in FIG. 8. As is shown in FIG. 9, Iw* and Ie* are added to a basic current Ib, the additional current pulses are applied to drive the laser diode 12, and a multipulse signal corresponding to the intended 4 T strategy is generated. When driven by this signal, the laser diode 12 outputs laser beam according the strategy. By irradiating the optical disk 24 with the laser beam, the intended signal (4 T mark in this instance) is recorded on the optical disk 24.

Requirements for this implementation are that the two Dout1 and Dout 2 output data signals are synchronized and that their delay amounts after pulse generation are even. In the light hereof, the two output data signals from the 4:2 multiplexer 11 are synchronized if they are in sync with a clock from the same source and their delay amounts are set uniform by transferring them through the two output lines having the same length. In view of the m:n multiplexer feature, input signal data bits are supplied at a lower speed by n/m than the output signals and, accordingly, a low-speed data input interface with reduced loss and crosstalk is applied and packaging is easy. By increasing the number of m, the number of parallel input data signals increases and data can be input at a still lower speed.

Embodiment 2

Figure 10A:
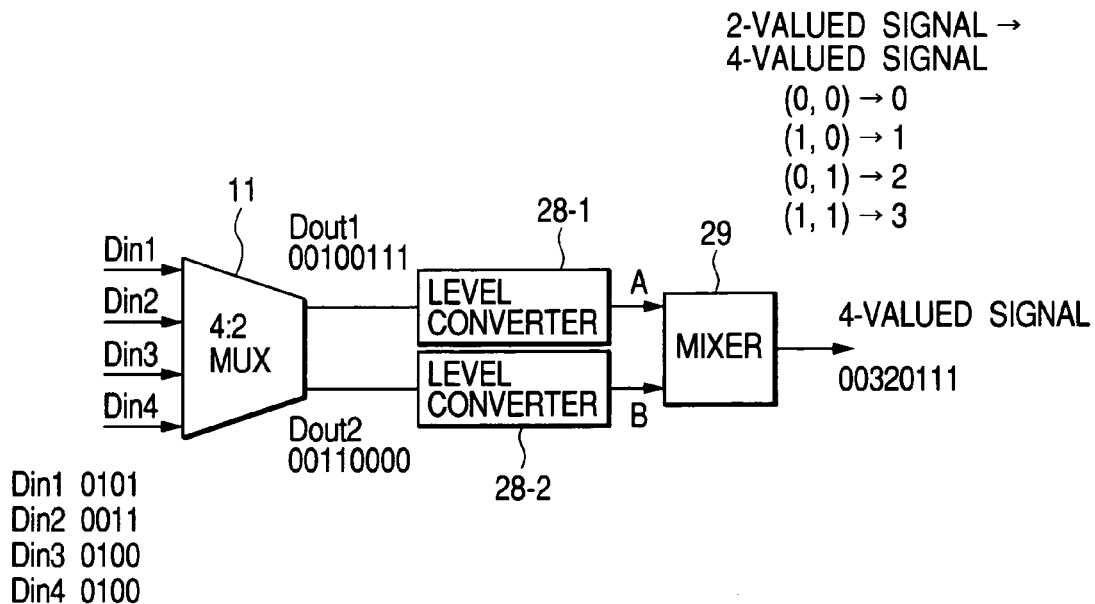
FIG. 10A is a schematic showing an equipment configuration example for generating a multilevel signal.
Figure 10B:
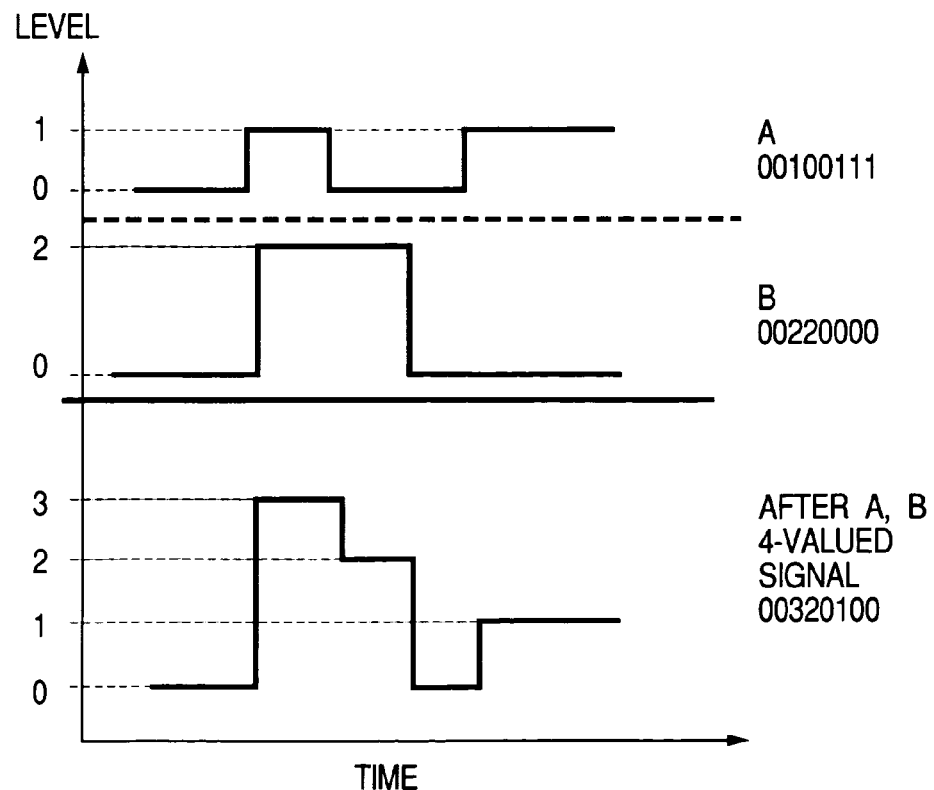
FIG. 10B is a signal waveform diagram showing an example of 4-valued multilevel signal composition.

A preferred Embodiment 2 of the invention wherein a 4:2 multiplexer is applied to generating multilevel signals is discussed. FIG. 10A is a schematic showing an equipment configuration example for generating a multilevel signal. FIG. 10B is a signal waveform diagram showing an example of 4-valued multilevel signal composition.

While a signal consisting of two values is output in Embodiment 1, Embodiment 2 enables output of a high-speed signal consisting of three or more values. As shown in FIG. 10A, input data is encoded into signals which are, in turn, converted into multilevel signals to be written on a disk. The thus converted signals are signals programmed to be multiplexed and input to the 4:2 multiplexer 11 from which two Dout1 and Dout2 signals are output. These two Dout1 and Dout2 output data signals which are synchronized and have even delay amounts are level converted by level converters 28-1 and 28-2, respectively, and then, combined through a mixer 29. The thus combined data signal becomes a signal with multiple electric power levels. In this way, a high-speed signal with multiple amplitude values can be generated.

Generating a 4-valued signal from two 2-valued signals is explained. A concrete instance is discussed where the 4:2 multiplexer 11 is used to make 2-value to 4-value conversion; that is, converting a combination of two 2-valued signals (0, 0) to multilevel 0, a combination (1, 0) to multilevel 1, a combination (0, 1) to multilevel 2, and a combination (1, 1) to multilevel 3. This instance assumes that four parallel signals are input to the 4:2 multiplexer 11; that is, "0101" through the Din1 input channel, "0011" through the Din2 input channel, "0100"through the Din3 input channel, and "0100" through the Din4 input channel to the multiplexer. The Din1 and Din2 signals are multiplexed to "00100111" which is output through the Dout 1 channel. The Din3 and Din4 signals are multiplexed to "00110000" which is output through the Dout2 channel. The Dout1 and Dout2 output signals become two times as fast as the Din1 to Din4 input signals.

The Dout1 signal is level converted to signal A by the level converter 28-1. The Dout2 signal is level converted to signal B by the level converter 28-2. As shown in FIG. 10B, signal A is a two-valued signal with unit level 1 of amplitude and signal B is a two-valued signal with unit level 2 of amplitude. Signal A and signal B are combined through the mixer 29 and, thereby, a signal "00320111" consisting of four values of 0, 1, 2, and 3 can be generated. While the 4-valued signal is output in this embodiment, it is possible to increase the number of n output signals from the m:n multiplexer so that a signal consisting of more values can be generated as a multilevel signal. According to Embodiment 2, such a high-speed multilevel data signal can be obtained with a simple hardware configuration.

Embodiment 3

Figure 12:
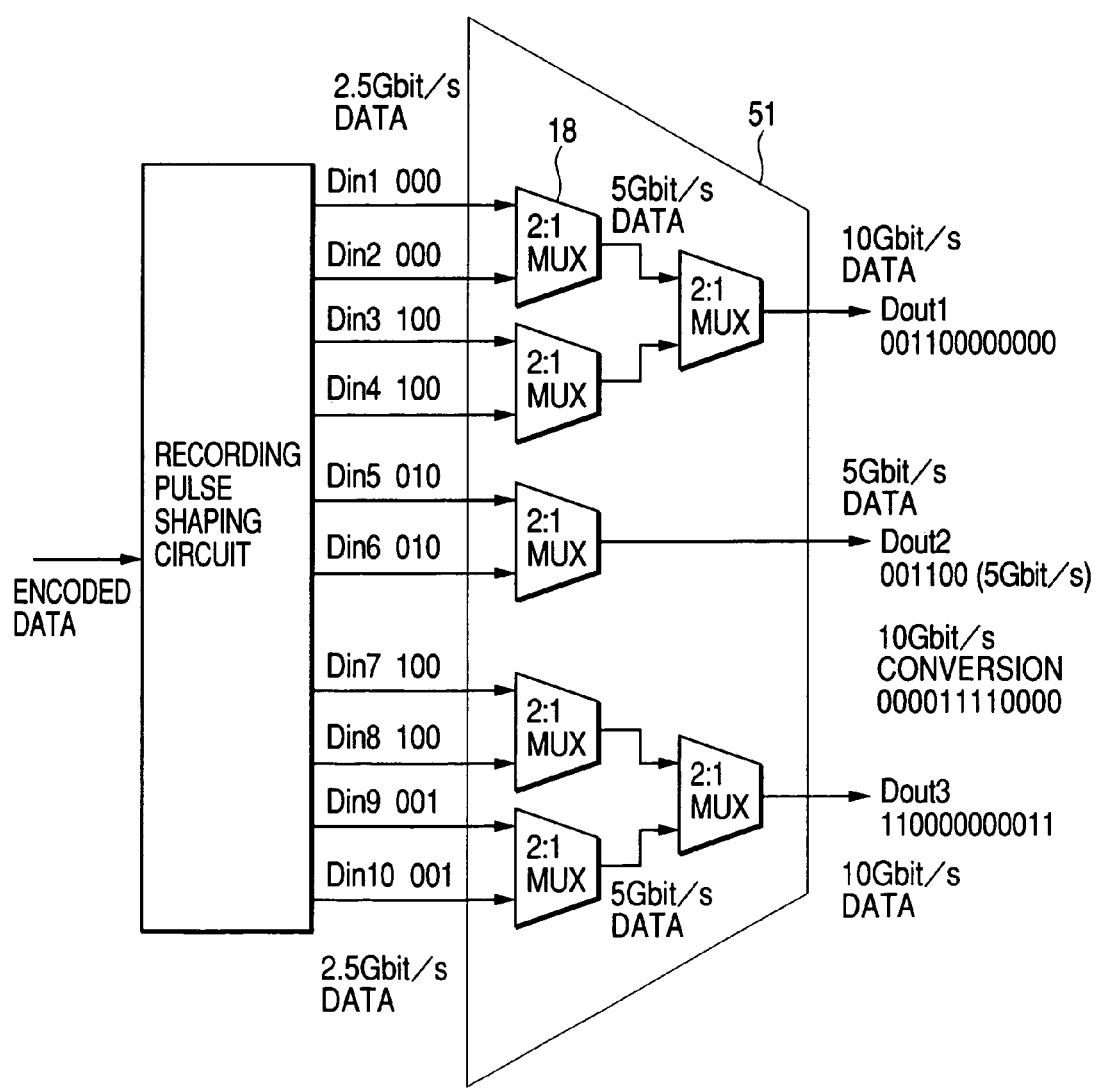
FIG. 12 is a schematic showing one example of an m:n multiplexer according to the present invention.

A preferred Embodiment 3 of the invention wherein the speed of n-pieces of output data signals from an m:n multiplexer is n times as much as the speed of input data signals and the n pieces of output data signals are at different speeds is discussed with reference to FIGS. 11 and 12. FIG. 11 is a diagram showing a write strategy example (with four power levels). FIG. 12 is a schematic showing one example of the m:n multiplexer according to the present invention.

If the strategy shown in FIG. 11 is required, a high positional accuracy is required for Pe and Pw1 which are programmed to form recording mark edges for edge recording, but the positional accuracy of Pw2 which is a medium level within the strategy need not be so high as Pe and Pw1. A configuration example of the m:n multiplexer that can meet this requirement is shown in FIG. 12.

A concrete instance where a 4 T write strategy shown at the bottom of FIG. 11 is created is discussed. As shown in FIG. 12, the recording pulse shaping circuit distributes signals to input "000" through a Din1 input channel, "000" through a Din2 input channel, "100" through a Din3 input channel, "100" through a Din4 input channel, "010" through a Din5 input channel, "010" through a Din6 input channel, "100" through a Din7 input channel, "100" through a Din8 input channel, "001" through a Din9 input channel, and "001" through a Din10 input channel to a 10:3 multiplexer 51, wherein all the input signals are at a data speed of 2.5 Gbps. The 10:3 multiplexer 51 multiplexes the Din1 to Din4 input signals to "001100000000" which is output through a Dout1 channel at a data speed of 10 Gbps and multiplexes the Din5 and Din6 input signals to "001100"which is output through a Dout2 channel at a data speed of 5 Gbps. In terms of 10 Gbps, because this signal is a ½ period, the signal is doubled; that is, "000011110000." The 10:3 multiplexer 51 also multiplexes the Din7 to Din10 input signals to "110000000011" which is output through a Dout3 channel at a data speed of 10 Gbps. The Dout1 signal (corresponding to Pe) and the Dout3 signal (corresponding to Pw1) are output with a clock accuracy of 10 GHz, whereas the Dout2 signal (corresponding to Pw2) is output with a clock accuracy of 5 GHz. By combining these signals, the intended strategy is created.

When an increased number of multipulse levels are used as in this instance, pulse generating circuit blocks to output only two pulses that are critical for forming the edges should be configured to generate the pulses with a maximum clock accuracy and other pulse generating circuit blocks should be configured to generate pulses with a clock accuracy degraded to a permissible degree. In consequence, decrease in circuitry size and reduction in power consumption can be effected. For multilevel signals as well, if there are an increased number of output channels, a clock frequency for each channel can be selected, according to clock accuracy requirement and decrease in circuitry size and reduction in power consumption can be effected.

Embodiment 4

Figure 13:
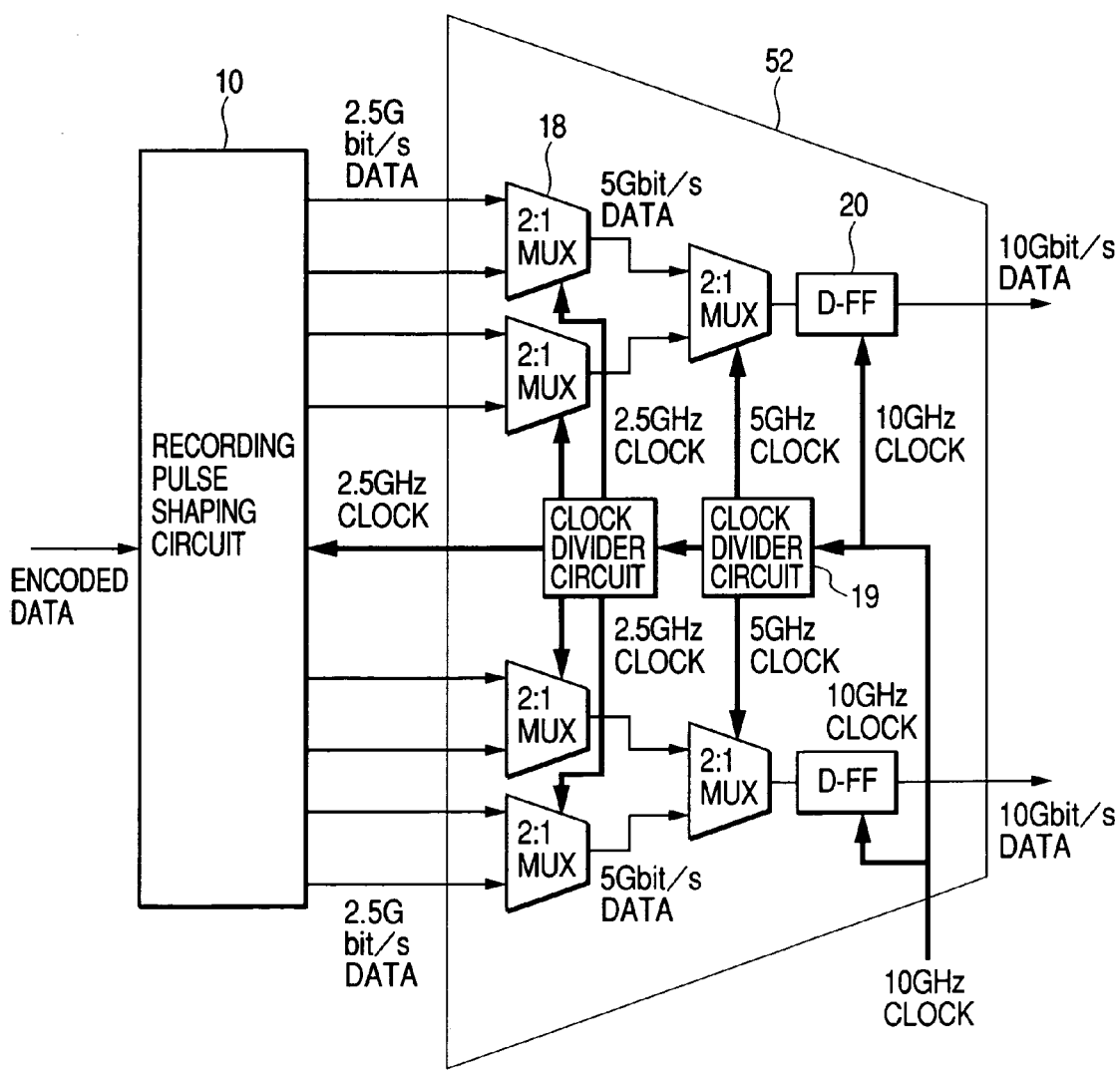
FIG. 13 is a schematic showing another example of an m:n multiplexer according to the present invention.

FIG. 13 is a diagram showing a preferred Embodiment 4 of the invention wherein an m:n multiplexer includes a clock divider function. In this embodiment, as an example, an 8:2 multiplexer which multiplexes eight input signals at a data speed of 2.5 Gbps to two output signals at a data speed of 10 Gbps is discussed.

In order to convert 2.5 Gbps input signals into signals to be output at a transfer rate multiplied to 10 Gbps, 2.5 GHz, 5 GHz, and 10 GHz clocks are required. In the m:n multiplexer 52, two clock dividers by two 19 are installed to provide the clock divider function. Using these clock dividers, by dividing a 10 GHz clock input to the m:n multiplexer 52, a 5 GHz clock and a 2.5 GHz clock can be generated internally in the m:n multiplexer. The thus generated low-speed 2.5 GHz clock is output from the m:n multiplexer 52 and input to the recording pulse shaping circuit 10. The recording pulse shaping circuit 10 generates parallel data signals to be input to the m:n multiplexer 52, using this 2.5 GHz clock, thus ensuring the synchronization of the data signals.

Recording data on optical disks at write speed multiplied by a factor of n can be dealt with by changing the frequency of the clock that is input to the m:n multiplexer 52. In response to change in the frequency of the clock that is input, the m:n multiplexer 52 comes to operate, based on the changed clock frequency. A divided clock that is output from the m:n multiplexer 52 changes correspondingly and the recording pulse shaping circuit 10 can change data speed accordingly so that data can be recorded at speed multiplied by a factor of n.

Embodiment 5

Figure 14:
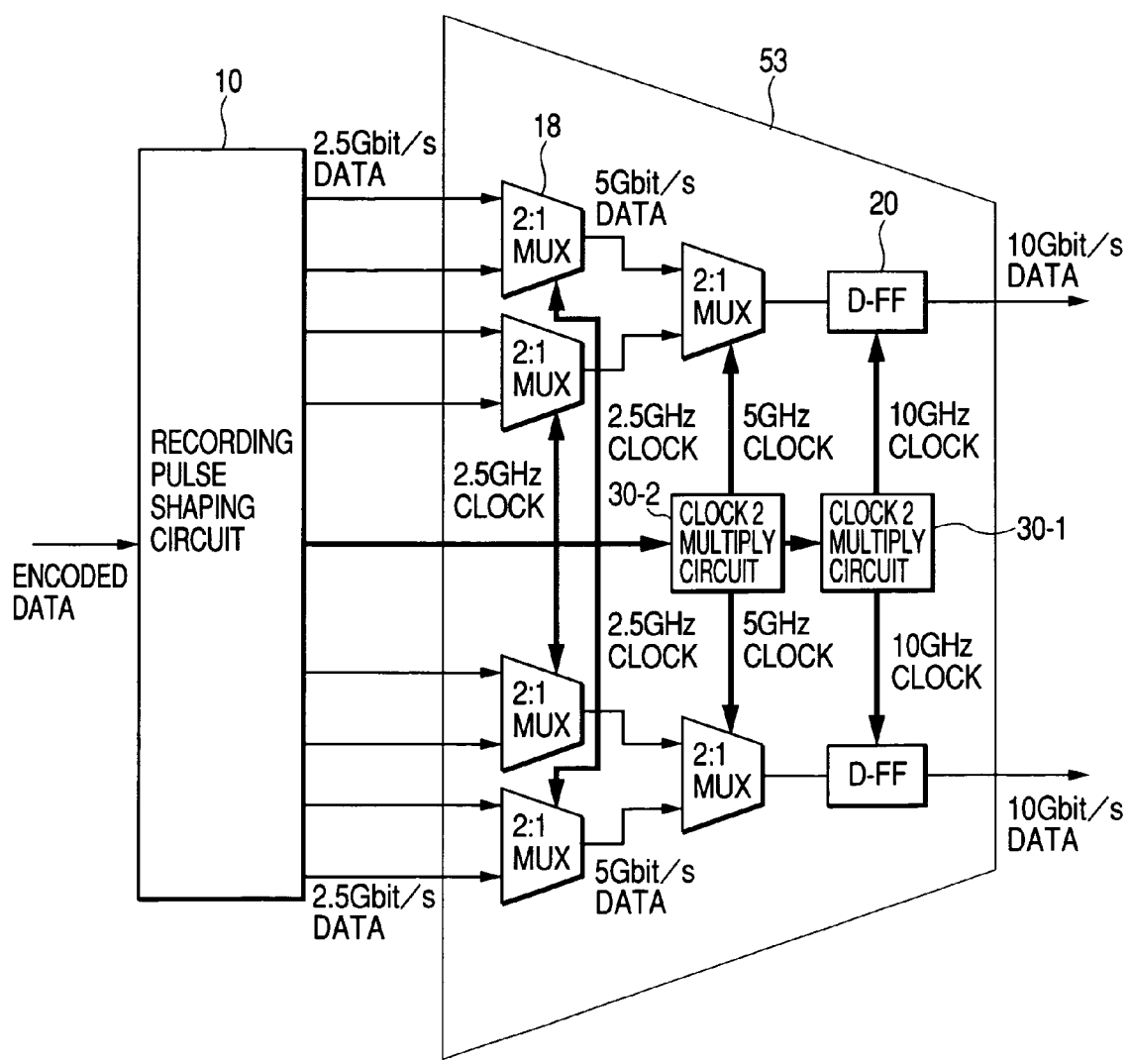
FIG. 14 is a schematic showing yet another example of an m:n multiplexer according to the present invention.

FIG. 14 is a diagram showing a preferred Embodiment 5 of the invention wherein an m:n multiplexer includes a clock multiplier function. In this embodiment, as an example, an 8:2 multiplexer which multiplexes eight input signals at a data speed of 2.5 Gbps to two output signals at a data speed of 10 Gbps is discussed.

2.5 GHz, 5 GHz, and 10 GHz clocks are required in Embodiment 5, as is the case in Embodiment 4. In the m:n multiplexer 53, clock multipliers by two 30-1 and 30-2 are installed to provide the clock multiplier function. Using these clock multipliers, a 2.5 GHz clock that is used to generate parallel 2.5 Gbps data signals in the recording pulse shaping circuit 10 is multiplied and 5 GHz and 10 GHz high-speed clocks are generated. Multiplexing and latching are performed, based on these high-speed clocks, and consequently, pulse positional accuracy can be enhanced. Because only the low-speed clock is used for input from the external, the high-speed clocks are not used externally and pulse positional accuracy can be boosted.

As is the case in Embodiment 4, recording data on optical disks at write speed multiplied by a factor of n can be implemented by changing the frequency of the clock used to generate input data signals in the recording pulse shaping circuit 10. In response to change in the frequency of the clock used to generate data signals in the recording pulse shaping circuit 10, the operating clock of the m:n multiplexer 53 changes correspondingly and, consequently, data can be recorded at speed multiplied by a factor of n.

Embodiment 6

Figure 15:
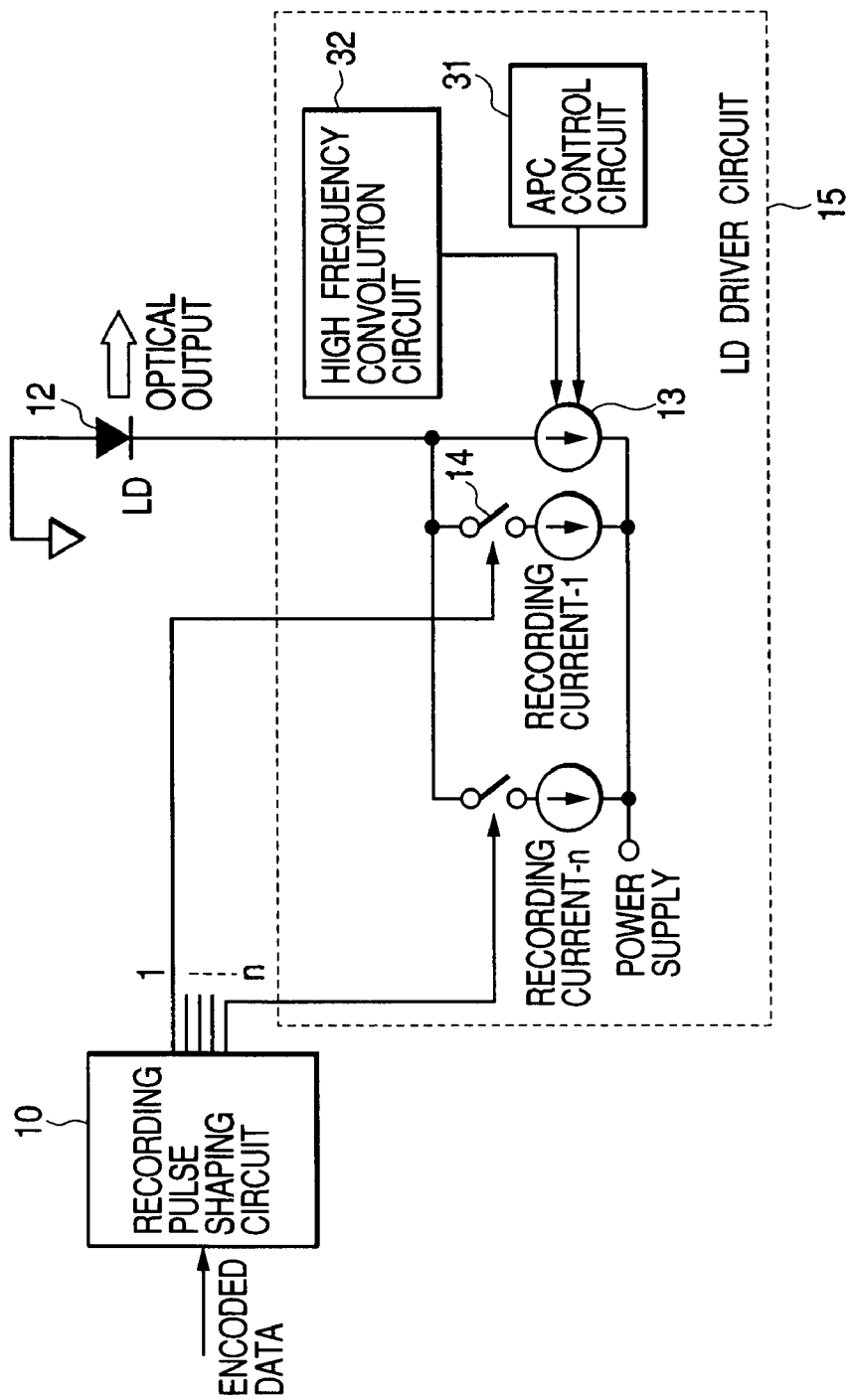
FIG. 15 is a diagram showing an optical recording equipment configuration including a conventional high speed convolution circuit.
Figure 16:
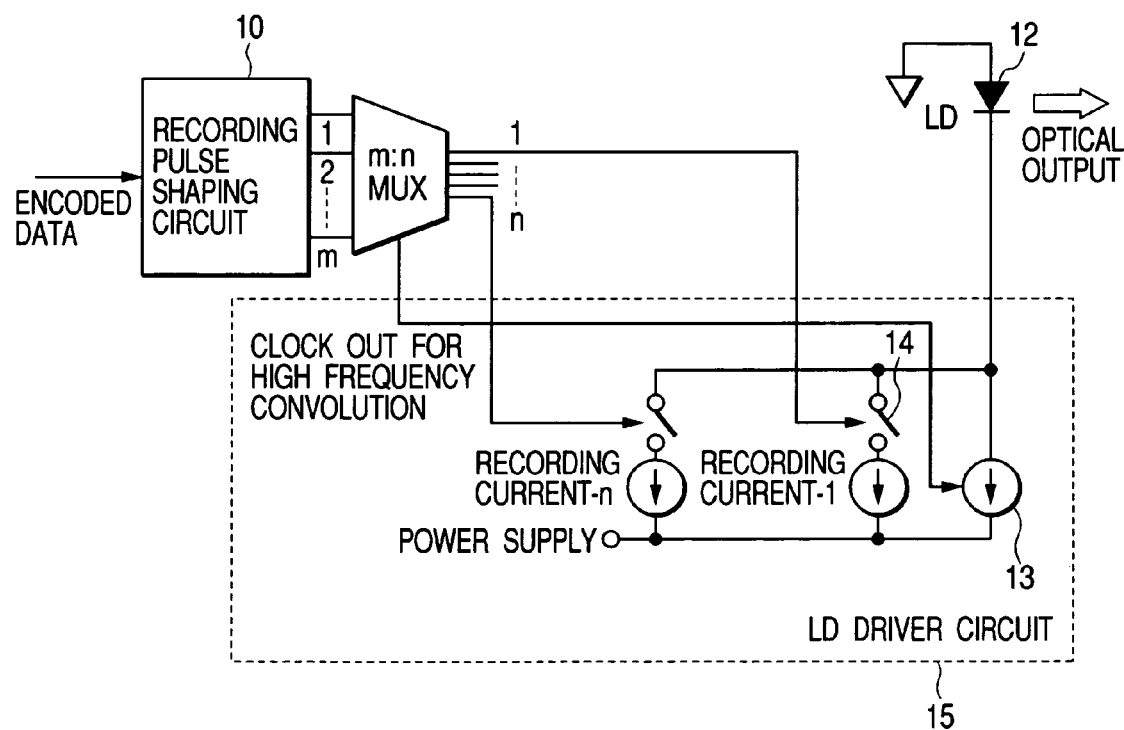
FIG. 16 is a diagram showing an optical recording equipment configuration using an m:n multiplexer according to the present invention.

A preferred Embodiment 6 of the invention wherein clock multiplier or divider output from an m:n multiplexer is used for high frequency convolution is shown in FIG. 16. As described in JP-A No. 123252/2003, when data is read, the laser diode (LD) oscillates to give a read power level by current that is controlled by Auto Power Control (APC). A high frequency convolution circuit is employed to reduce mode hopping noise and back photo induction noise caused by the laser diode operation during a read. During writing/erasing, the high frequency convolution may be deactivated from a viewpoint of laser lifespan. Generally, a high frequency convolution circuit 32 dedicated to this high frequency convolution is required as shown in FIG. 15.

In Embodiment 6, by arbitrarily selecting a clock generated from a clock divider or a clock multiplier that is used to generate pulses within the m:n multiplexer 11 and outputting the clock, high frequency convolution can be performed without employing the circuit dedicated to high frequency convolution, as is shown in FIG. 16. It may also be preferable to provide a power supply for the clock divider or clock multiplier separately from the power supply for the multiplexer section in order to enable high frequency convolution ON/OFF selection during a read, write, and erasing.

Embodiment 7

Figure 17A:
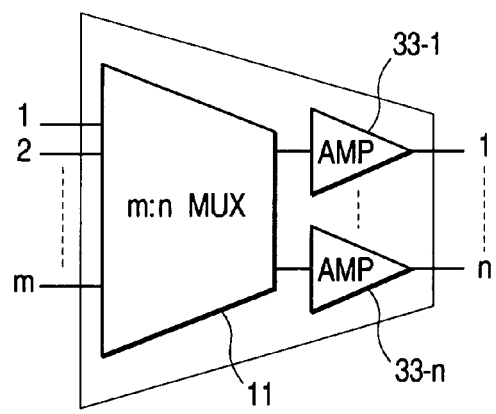
FIG. 17A is a schematic of a further example of an m:n multiplexer according to the present invention.

A preferred Embodiment 7 of the invention wherein the amplitudes of output signals from an m:n multiplexer are made variable is shown in FIG. 17. One trend of LSI technology is packaging mixed digital and analog circuits to design high integrated and high functionality IC chips. Although multiplexers are generally digital circuits, amplifiers 33-1, . . . , 33-n which are analog circuits are added to the output portion of the m:n multiplexer 11, as shown in FIG. 17A. By way of this configuration, the amplitudes of n output signals from the m:n multiplexer can be made variable and tunable.

Figure 17B:
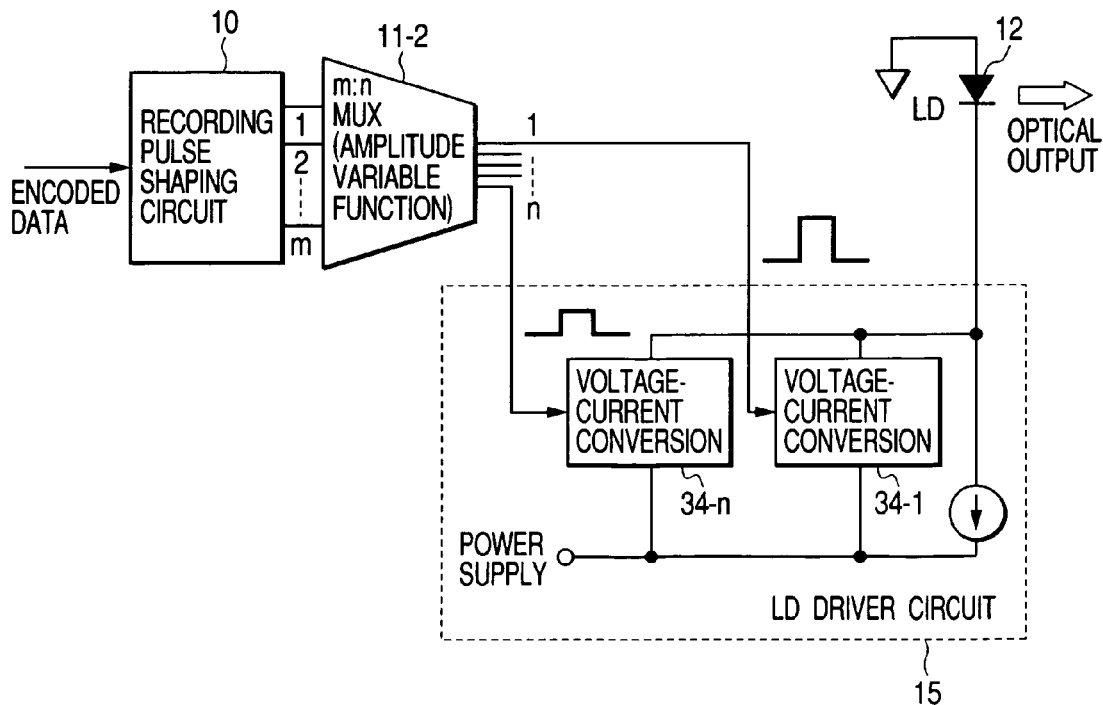
FIG. 17B is a diagram showing a configuration example of optical recording equipment using the m:n multiplexer according to the present invention.

When this m:n multiplexer is used, the configuration of a laser driver circuit 15 connected to the multiplexer in the following stage can be improved. Specifically, the driver circuit essentially comprises voltage-current converters 34-1, . . . , 34-n, as shown in FIG. 17B. This laser driver circuit is configured to receive n pieces of data signals with different voltages and convert the signals into current in a liner range such that voltage difference is directly converted to current difference. Depending on this current difference, the intensity of laser beam emitted from the laser diode changes. Thus, the driver circuit dispensing with high-speed switches can be constructed.

Embodiment 8

Figure 18A:
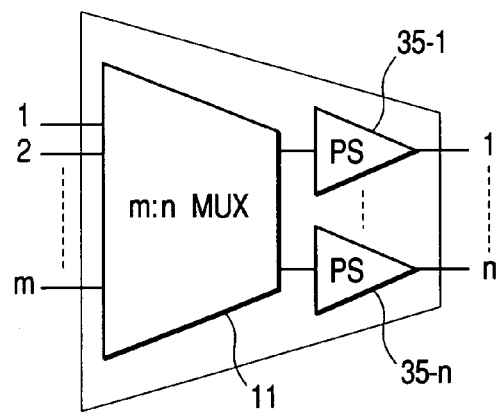
FIG. 18A is a schematic of a still further example of an m:n multiplexer according to the present invention.

A preferred Embodiment 8 of the invention wherein the delay amounts of n output data signals from an m:n multiplexer are made variable is shown in FIG. 18. Phase shifters 35-1, . . . , 35-n which are able to make a phase shift when given an electric signal are added to the output portion of the m:n multiplexer 11, as shown in FIG. 18A. By way of this configuration, the phases of the n output signals from the m:n multiplexer can be made variable and tunable.

Figure 18B:
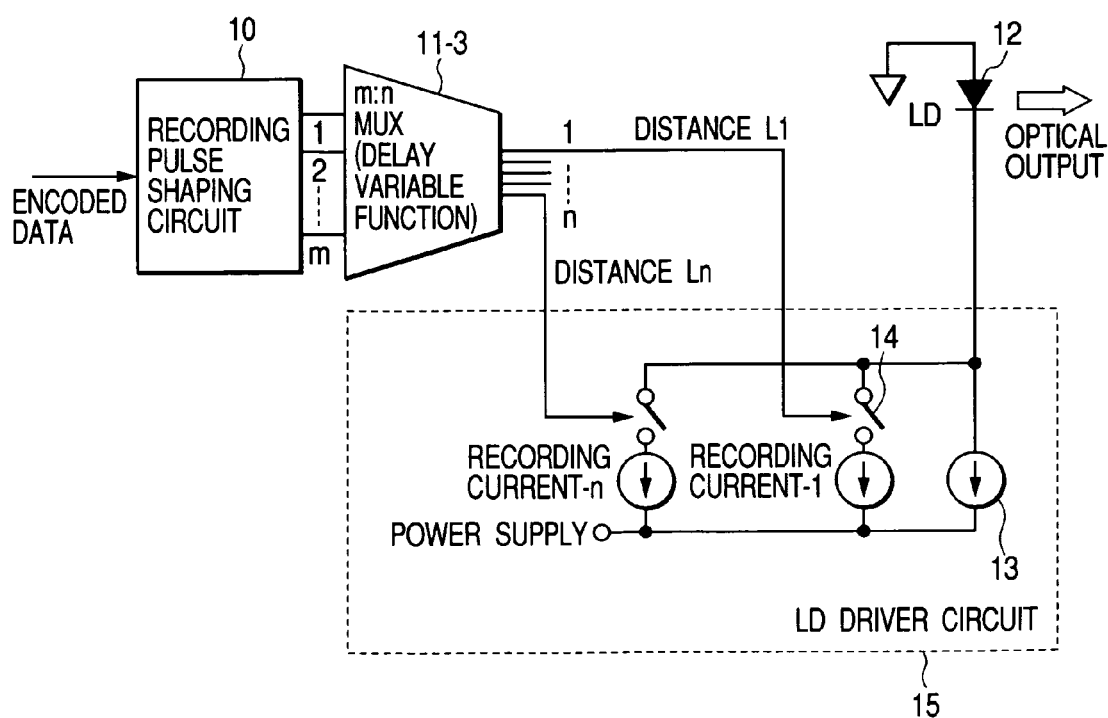
FIG. 18B is a diagram showing another configuration example of optical recording equipment using the m:n multiplexer according to the present invention.

When the phases of the n output signals from the m:n multiplexer is made variable, restriction of distance from the multiplexer to the driver circuit can be relaxed. As is shown in FIG. 18B, if the lengths of the channels L1 to Ln to the driver circuit 15 connected to the multiplexer in the following stage differ for the n pieces of signals, the delay amounts of the n pieces of data signals differ, which causes trouble when the signals are combined into a multipulse or multi-level signal. This problem of delay amount difference becomes significant especially for high-speed operation. The m:n multiplexer of this embodiment is provided with a function to adjust the delay amounts of the output data signals and is able to make the delay amounts equivalent at the input of the driver circuit 15 even if the lengths of the channels L1 to Ln of the n pieces of output data signals differ due to wiring and packaging problems.

Embodiment 9

Figure 19:
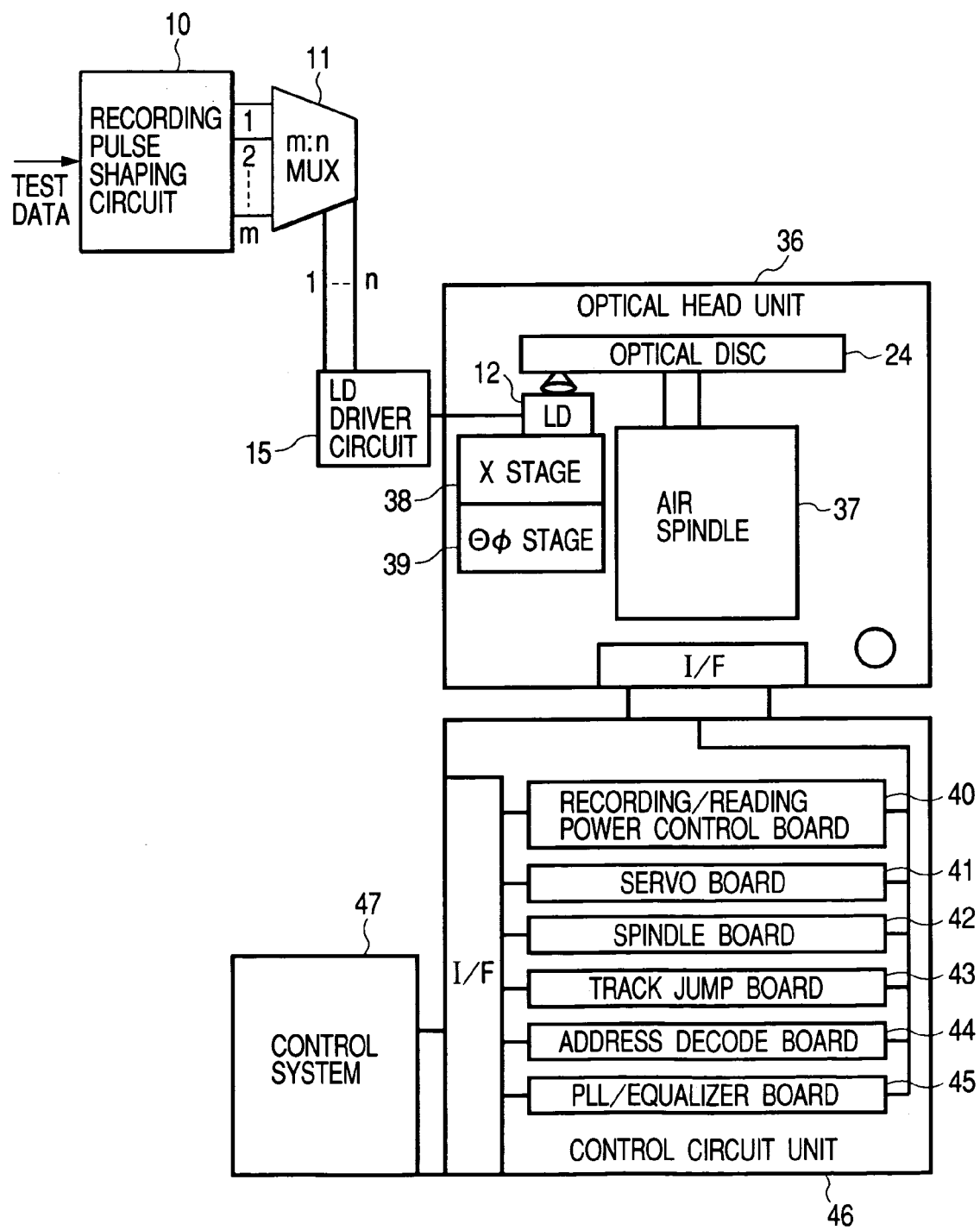
FIG. 19 is a diagram showing a configuration example of optical disk evaluation equipment using an m:n multiplexer according to the present invention.

FIG. 19 shows a configuration example of optical disk evaluation equipment to which the present invention is applied. An optical head unit 36 comprises optics arrangement including a laser diode 12, an air spindle 37 which enables an optical disk 24 to revolve at a high speed, an X stage 38 and a θφ stage 39 for changing the X stage position and the angle θφ of the stage, and other components.

A control circuit unit 46 controls operation, using test data. The control circuit unit comprises a recording/reading power control board 40 which controls light emission to give commanded write/read power, a servo board 41 for servo adjustment, a spindle control board 42 which controls the spindle motor, a track jump board 43 which controls track jump operation to enable write/read in an intended position, an address decode board 44 which reads code data and address data recorded on the optical disk medium, using a read signal, and a PLL (Phase Locked Loop)/equalizer board 45. The evaluation equipment further includes a control system 47 which exerts overall control of the control circuit unit.

This evaluation equipment is not a standalone system like ordinary optical disk drive devices and is a system that operates in response to a variety of adjustment and control. Operation under a variety of adjustment and control can be evaluated and adjustment margins can be measured.

When the present invention is applied, test data is input and results can be used to examine strategy optimization regarding the number of multipulse levels, pulse width, etc.

Embodiment 10

Figure 20A:
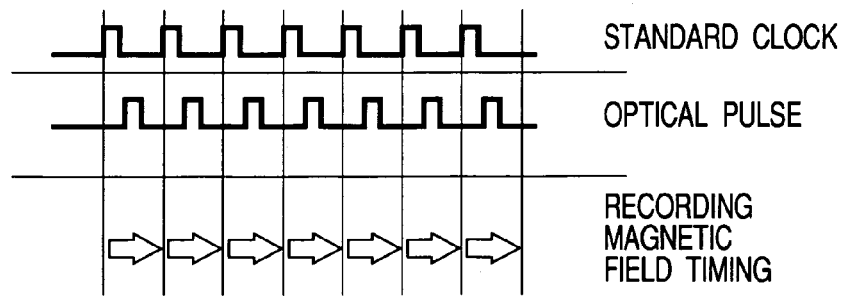
FIG. 20A is a timing chart of a write operation of a magneto optical disk system.

FIG. 20 is a diagram showing a preferred Embodiment 10 of the invention wherein the present invention is applied to a magneto optical disk system. FIG. 20A is a timing chart of a write operation of the magneto optical disk system for recording, as described in JP-A No. 229588/2001.

Figure 20B:
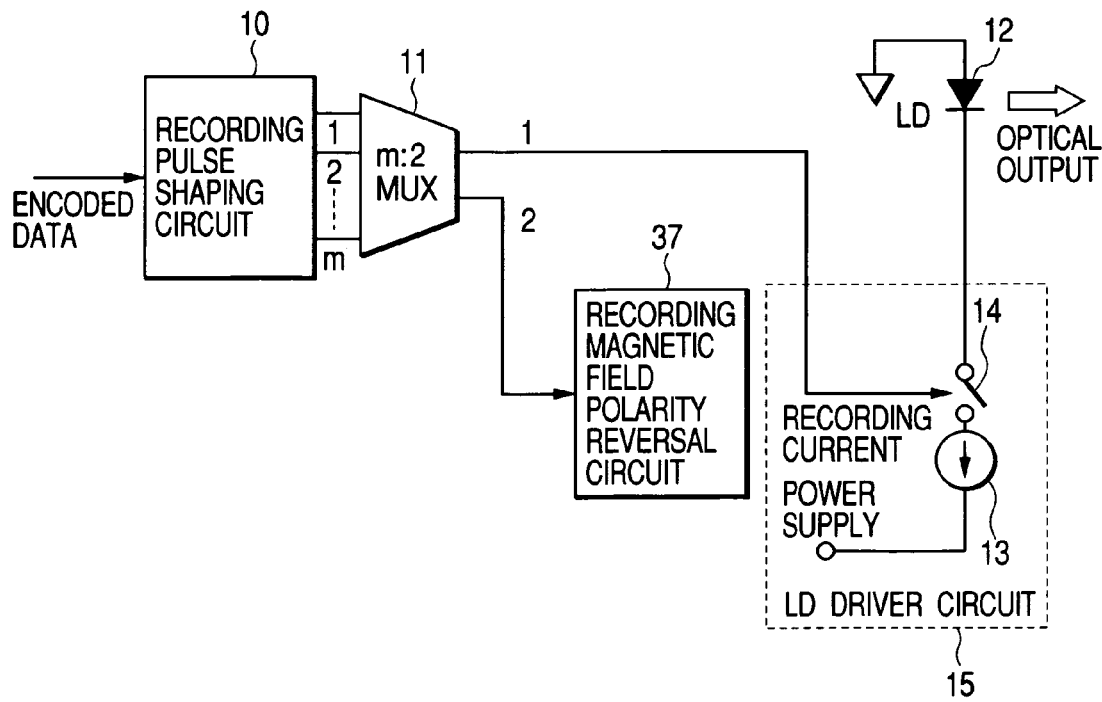
FIG. 20B is a diagram showing an example of application of the present invention to a magneto optical disk system.

In this embodiment, as shown in FIG. 20A, data is recorded by intermittently heating a magnetic recording medium by irradiating the medium with laser beam pulses in synchronization with a reference clock, while applying a magnetic field with polarity being reversed in accordance with code of data to be recorded in synchronization with the reference clock. FIG. 20B is a schematic of circuitry which controls light irradiation and magnetic field application by the output of an m:2 multiplexer, including a recording magnetic field polarity reversal circuit 37. With respect to synchronization between optical pulses and magnetic modulation in this case, with the development of high-speed recording technology, as described hereinbefore, compatibility between clock accuracy and synchronization operation is required, and therefore, application of the present invention is effective.

While the present invention has been described, based on its preferred embodiments, it will be appreciated that the present invention is not limited to the illustrative embodiments described hereinbefore. It will be obvious that the invention may be embodied in other modified forms and various changes, improvements, and combinations can be made without departing from its spirit or essential characteristics.

What is claimed is:

1. An information recording method for recording information on an information recording media by means of light or magnetism, comprising the steps of:

converting an encoded data into m pieces of parallel data bits;

inputting m pieces of data bits as an input signal to a multiplexing circuit to which m pieces of data bits are input and which outputs n pieces of data bits (hereinafter referred to as an m:n multiplexer), where $m > n \geq 2$;

synchronizing the n pieces of output data bits by obtaining a clock used for multiplexing the m pieces of input data bits into the n pieces of output data bits from a single generating source, and outputting n pieces of data bits from the m:n multiplexer at a speed greater than that of the input signal; and recording information with the n pieces of data bits.

2. The information recording method according to claim 1, wherein a multipulse signal is formed of said n pieces of data bits.

3. The information recording method according to claim 1, wherein multilevel recording is performed by using said n pieces of data bits.

4. The information recording method according to claim 1, wherein the n pieces of output data from said m:n multiplexer are at a speed multiplied by n times as fast as the input data speed and a speed can be selected arbitrarily for each of the n pieces of data.

5. An information recording equipment comprising:

an encoding circuit which encodes data to be recorded;

a recording pulse shaping circuit to which output of said encoding circuit is input and which outputs m pieces of pulse signals as parallel signals;

an m:n multiplexer which multiplexes the m pieces of pulse signals output from said recording pulse shaping circuit and outputs n pieces of pulse signals, where $m > n \geq 2$;

a laser driver circuit which is driven by the n pieces of output signals from said m:n multiplexer; and a laser beam source which is driven by output of said laser driver circuit, wherein the m:n multiplexer synchronizes the n nieces of output data bits by obtaining a clock used for multiplexing the m pieces of input data bits into the n pieces of output data bits from a single generating source.

6. The information recording equipment according to claim 5, wherein said laser driver circuit outputs a multipulse signal in conformity with a write strategy.

7. The information recording equipment according to claim 5, wherein said m:n multiplexer includes a clock dividing circuit and said recording pulse shaping circuit uses a clock generated from said clock dividing circuit as a synchronous signal.

8. The information recording equipment according to claim 5, wherein said m:n multiplexer includes a clock multiplying circuit and uses a clock which is obtained by multiplying a clock output from said recording pulse shaping circuit by a factor of n through said clock multiplying circuit as a synchronous signal for signal multiplexing.

9. The information recording equipment according to claim 5, wherein said m:n multiplexer includes amplitude adjustment circuits which are able to vary the amplitudes of the n pieces of output signals from said m:n multiplexer.

10. The information recording equipment according to claim 5, wherein said m:n multiplexer includes delay adjustment circuits which are able to vary the delay amounts of the n pieces of output signals from said m:n multiplexer.

11. The information recording equipment according to claim 5, further comprising:

a plurality of level converters which adjust the levels of the n pieces of output signals from said m:n multiplexer; and a mixer circuit which combines output signals from said plurality of level converters into a multilevel signal.

12. The information recording equipment according to claim 5, further comprising:

a recording magnetic field polarity reversal circuit which causes a magnetic field to be reversed in synchronization with a light pulse emitted from said laser beam source, a laser beam source which is driven by output of said laser driver circuit; and a control circuit unit which controls operation, using said test data.

13. An evaluation equipment comprising:

an encoding circuit which encodes test data;

a recording pulse shaping circuit to which output of said encoding circuit is input and which outputs m pieces of pulse signals as parallel signals;

an m:n multiplexer which multiplexes the m pieces of pulse signals output from said recording pulse shaping circuit and outputs n pieces of pulse signals, where m>n≧2;
a laser driver circuit which is driven by the n pieces of output signals from said m:n multiplexer;
a laser beam source which is driven by output of said laser driver circuit; and
a control circuit unit which controls operation, using said test data, wherein
the m:n multiplexer synchronizes the n pieces of pulse signals by obtaining a clock for multiplexing the m pieces of pulse signals into the n pieces of pulse signals from a single generating source.

14. The evaluation equipment according to claim 13, wherein said control circuit unit comprises a recording/reading power control board, a servo board, a spindle control board, a track jump control board, an address decode board, and PLL (phase locked loop)/equalizer control board.

15. The evaluation equipment according to claim 13, further comprising a control system which controls said control circuit unit.

* * * * *

UNITED STATES PATENT AND TRADEMARK OFFICE
CERTIFICATE OF CORRECTION

PATENT NO.        : 7,317,665 B2
APPLICATION NO.   : 10/773437
DATED             : January 8, 2008
INVENTOR(S)       : Watanabe et al.

Page 1 of 1

It is certified that error appears in the above-identified patent and that said Letters Patent is hereby corrected as shown below:

On the Title Page, Item (30) please <u>DELETE</u>:

July 11, 2003   (JP)…………2003-378857 and <u>ADD</u> on the Title Page, Item (30):

November 7, 2003   (JP))…………2003-378857

Signed and Sealed this

Eighth Day of July, 2008

JON W. DUDAS
*Director of the United States Patent and Trademark Office*